(12) United States Patent
Marcus

(10) Patent No.: US 7,337,550 B2
(45) Date of Patent: Mar. 4, 2008

(54) COMBINATION SQUARE

(75) Inventor: Howard Marcus, Ramat Hagolan (IL)

(73) Assignee: Kapro Industries Ltd., Hakarem (IL)

( * ) Notice: Subject to any disclaimer, the term of this patent is extended or adjusted under 35 U.S.C. 154(b) by 28 days.

(21) Appl. No.: 10/591,738

(22) PCT Filed: Feb. 28, 2005

(86) PCT No.: PCT/IL2005/000236

§ 371 (c)(1),
(2), (4) Date: Sep. 6, 2006

(87) PCT Pub. No.: WO2005/087512

PCT Pub. Date: Sep. 22, 2005

(65) Prior Publication Data

US 2007/0204475 A1 Sep. 6, 2007

(30) Foreign Application Priority Data

Mar. 11, 2004 (IL) ...................................... 160834

(51) Int. Cl.
*B43L 13/00* (2006.01)

(52) U.S. Cl. ........................ 33/480; 33/427; 33/452; 33/DIG. 1

(58) Field of Classification Search .................. 33/480, 33/427, 334, 354, 418–419, 452, 472–474, 33/383–384

See application file for complete search history.

(56) References Cited

U.S. PATENT DOCUMENTS

| 2,337,248 A | 12/1943 | Koller |
| 3,824,700 A | 7/1974 | Rutty |
| 4,599,806 A | 7/1986 | Wright |
| 5,174,446 A | 12/1992 | Czopor, Jr. |
| 5,276,973 A | 1/1994 | Rakauskas |
| 5,339,530 A | 8/1994 | Wright et al. |
| 5,377,418 A | 1/1995 | Anderson et al. |
| 5,778,547 A | 7/1998 | Wolken et al. |
| 5,933,974 A * | 8/1999 | Walters et al. ................. 33/474 |
| 6,553,677 B2 * | 4/2003 | Szumer ........................ 33/480 |
| 6,839,974 B1 * | 1/2005 | Hitchcock .................... 33/473 |
| 6,996,911 B1 * | 2/2006 | Dinius .......................... 33/481 |
| 7,178,252 B1 * | 2/2007 | Belgard ........................ 33/412 |

FOREIGN PATENT DOCUMENTS

DE    33 14 344    10/1984

\* cited by examiner

*Primary Examiner*—Yaritza Guadalupe-McCall
(74) *Attorney, Agent, or Firm*—Harold L. Novick; The Nath Law Group

(57) ABSTRACT

Novel combination squares for magnetically retaining a magnetic rule-type blade in a blade retaining slot. Novel combination squares including an L-shaped rule-type blade.

7 Claims, 3 Drawing Sheets

COMBINATION SQUARE

CROSS-REFERENCE TO RELATED APPLICATIONS

This application is the United States National Stage filing of PCT Application PCT/Il2005/000236 having an international filing date of 28 Feb. 2005.

FIELD OF THE INVENTION

The invention is in the field of combination squares.

BACKGROUND OF THE INVENTION

Conventional combination squares include a polygonal housing for releasably frictionally retaining a typically graduated stainless steel 12″ grooved rule-type blade in a blade retaining slot for subtending a 90° shoulder and/or a 45° shoulder with opposite side surfaces of the housing. Exemplary combination squares with a screw operated L-shaped stopping member for engaging a grooved blade are disclosed in inter alia U.S. Pat. No. 3,824,700, U.S. Pat. No. 4,599,806, U.S. Pat. No. 5,174,446, U.S. Pat. No. 5,276,973, and U.S. Pat. No. 5,778,547. Commonly assigned U.S. Pat. No. 6,553,677 illustrates and describes a combination square with a pair of opposing housings having a manually operated clamping arrangement for engaging a grooved blade.

Use of a combination square involves frequent lengthwise adjustment of a blade along its blade retaining slot to newly desired positions. Each lengthwise adjustment requires an inconvenient releasing of a blade within a blade retaining slot and re-securing therein. Use of a combination square also involves less frequent but more time consuming and cumbersome accurate alignment and sliding re-insertion of a blade into its blade retaining slot to use different scales in the case that a blade is provided with same along opposite long edges or after using its housing as a spirit level in the case that it is provided with a bubble vial.

SUMMARY OF THE INVENTION

The present invention is for a novel combination square with a magnetic housing for magnetically retaining a magnetic rule-type blade in a blade retaining slot for subtending a 90° shoulder and/or a 45° shoulder with opposite side surfaces of the housing in a top view of the combination square. A magnetic housing may rely solely on magnetic force to retain a magnetic rule-type blade therein, thereby considerably simplifying the use of a combination square in accordance with the present invention in comparison to conventional combination squares. In this case, a rule-type blade may be a conventional grooved rule-type blade possibly even previously purchased with a conventional combination square, or a non-grooved rule-type blade. Alternatively, a magnetic housing may be provided with a runner for constraining a grooved rule-type blade to sliding lengthwise movement in a blade retaining slot. Additionally or alternatively, a magnetic housing may be provided with a securing member for selectively bearing against a rule-type blade for frictionally securing the rule-type blade therein. The rule-type blade can be a conventional straight rule-type blade or it can have an L-shape in a top view of the combination square thereby enabling the combination square to be abutted against a surface, a wall, and the like for layout and measuring purposes. Such an L-shape rule-type blade can also be employed with conventional combination squares.

BRIEF DESCRIPTION OF THE DRAWINGS

In order to understand the invention and to see how it can be carried out in practice, preferred embodiments will now be described, by way of non-limiting examples only, with reference to the accompanying drawings in which similar parts are likewise numbered, and in which.

DESCRIPTION OF PREFERRED EMBODIMENTS OF THE INVENTION

Figure 1:
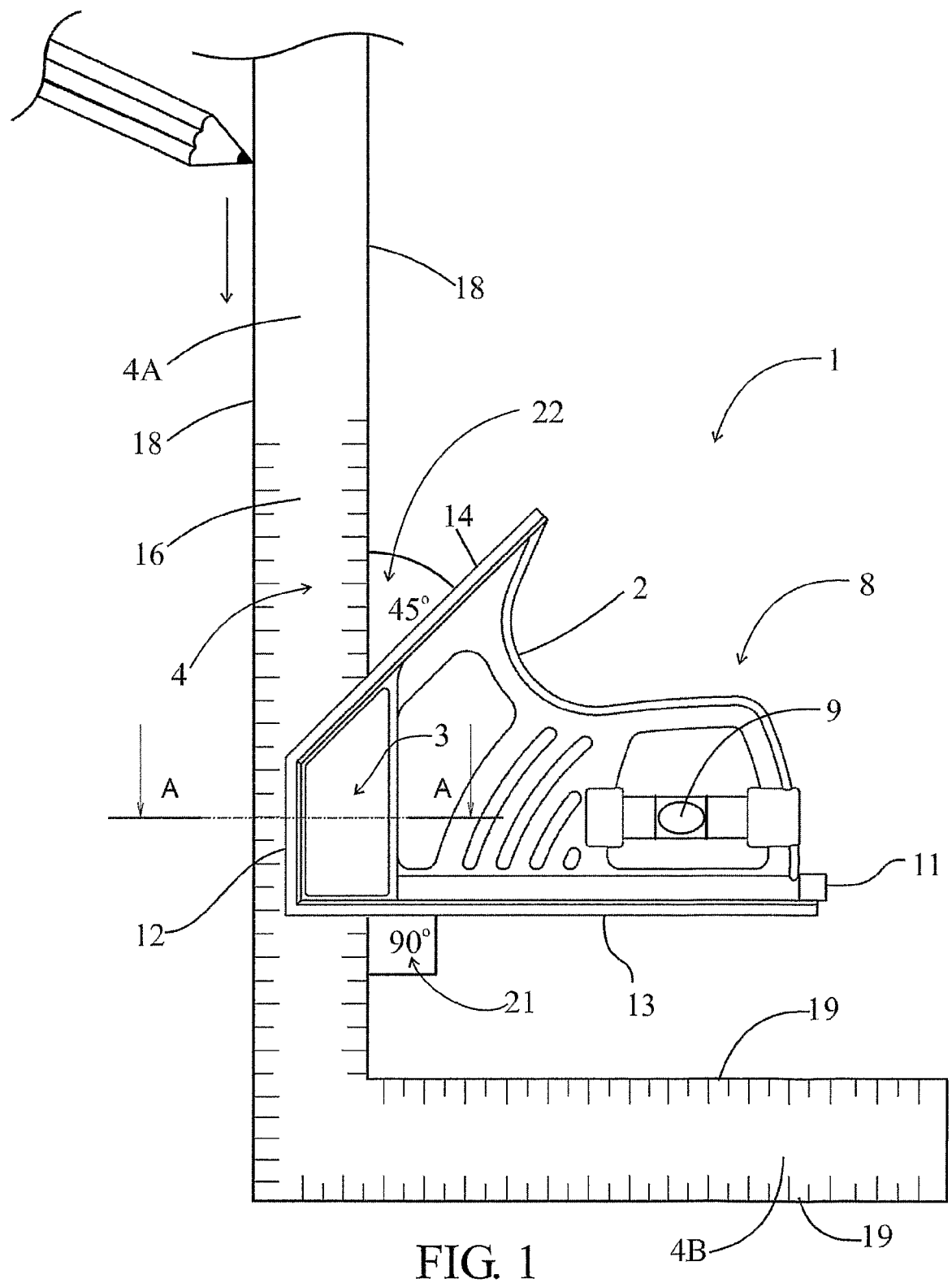
FIG. 1 is a top view of a first embodiment of a combination square in accordance with the present invention laid flat on a planar support surface.

FIG. 1 shows a combination square 1 including a magnetic housing 2 having a leading portion 3 for releasably magnetically retaining a non-grooved L-shape magnetic graduated 12 rule-type blade 4 in a blade retaining slot 6 (see FIGS. 2A, 2B and 2C), and a trailing portion 8 with a bubble vial 9, and a scribe 11. The leading portion 3 has a front surface 12, and opposite side surfaces 13 and 14 respectively subtending internal 90° and 135° angles with respect lateral to the front surface 12 in a top view of the combination square 1.

The blade 4 is preferably made of stainless steel but alternatively it may be formed from non-magnetic material with inserts to render it magnetic, namely, capable of being attracted by a magnetic force to a magnet. The blade 4 has a top surface 16, and a bottom surface 17. The blade 4 has a long leg 4A with opposite long edges 18, and a short leg 4B with opposite long edges 19. The long edges 18 and 19 are provided with scales for measuring purposes. Depending on the blade's position, its long edge 18 facing the housing 2 can subtend a 90° shoulder 21 with the side surface 13 and/or a 45° shoulder 22 with the side surface 14.

Figure 2A:
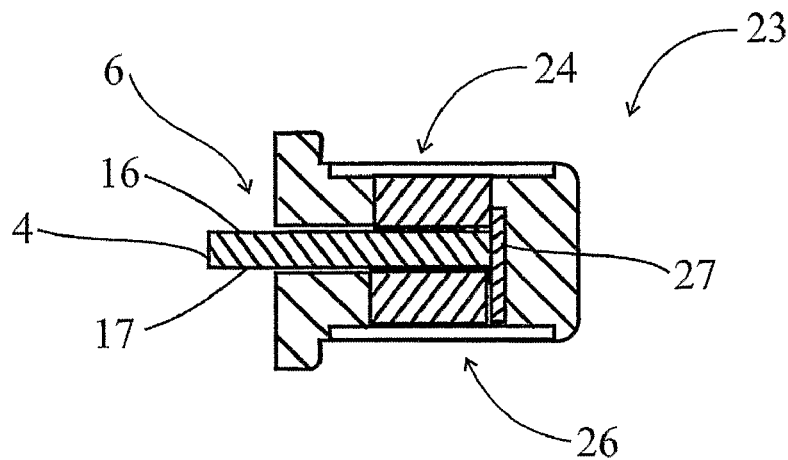
FIGS. 2A, 2B and 2C are cross sections of FIG. 1's combination square along section line A-A showing three alternative magnetic housings.
Figure 2B:
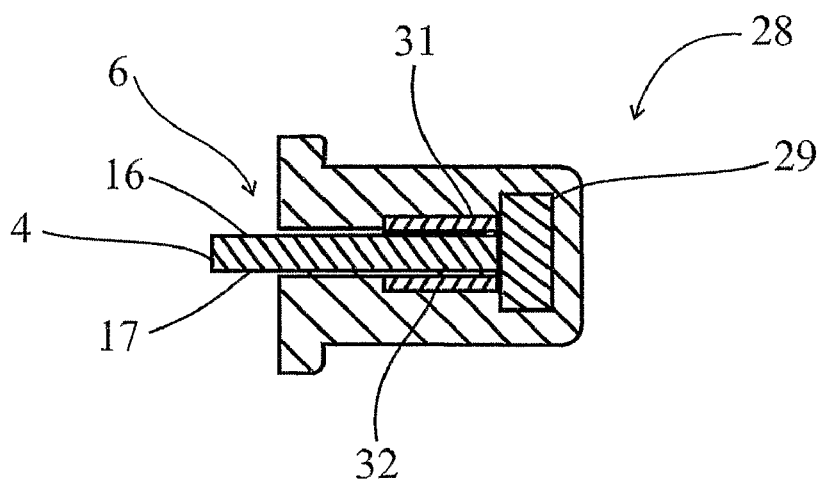
Figure 2C:
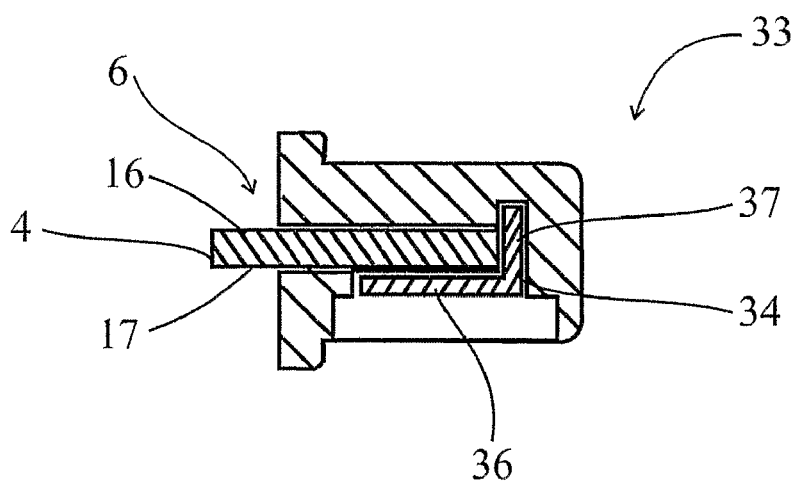

FIG. 2A shows a magnetic housing 23 with one or more highly magnetic disc magnets 24 and 26 above and below the blade 4 such that their major surfaces are parallel to the blade's top and bottom surfaces 16 and 17. The magnetic housing 23 can include one or more magnetic members 27 extending lengthwise along the blade retaining slot 6 for providing an additional sideways magnetic force for retaining the blade 4 therein. FIG. 2B shows a magnetic housing 28 with one or more highly magnetic disc magnets 29 along the blade retaining slot 6 such that their major surfaces are perpendicular to the blade's top and bottom surfaces 16 and 17. The magnetic housing 28 can include one or more magnetic members 31 and 32 above and below the blade 4 for providing an additional magnetic force for retaining the blade 4 in the blade retaining slot 6. FIG. 2C shows a magnetic housing 33 with one or more highly magnetic L-shaped magnets 34 with their major surfaces 36 parallel to the blade's top and bottom surfaces 16 and 17, and their minor surfaces 37 perpendicular thereto.

Figure 3:
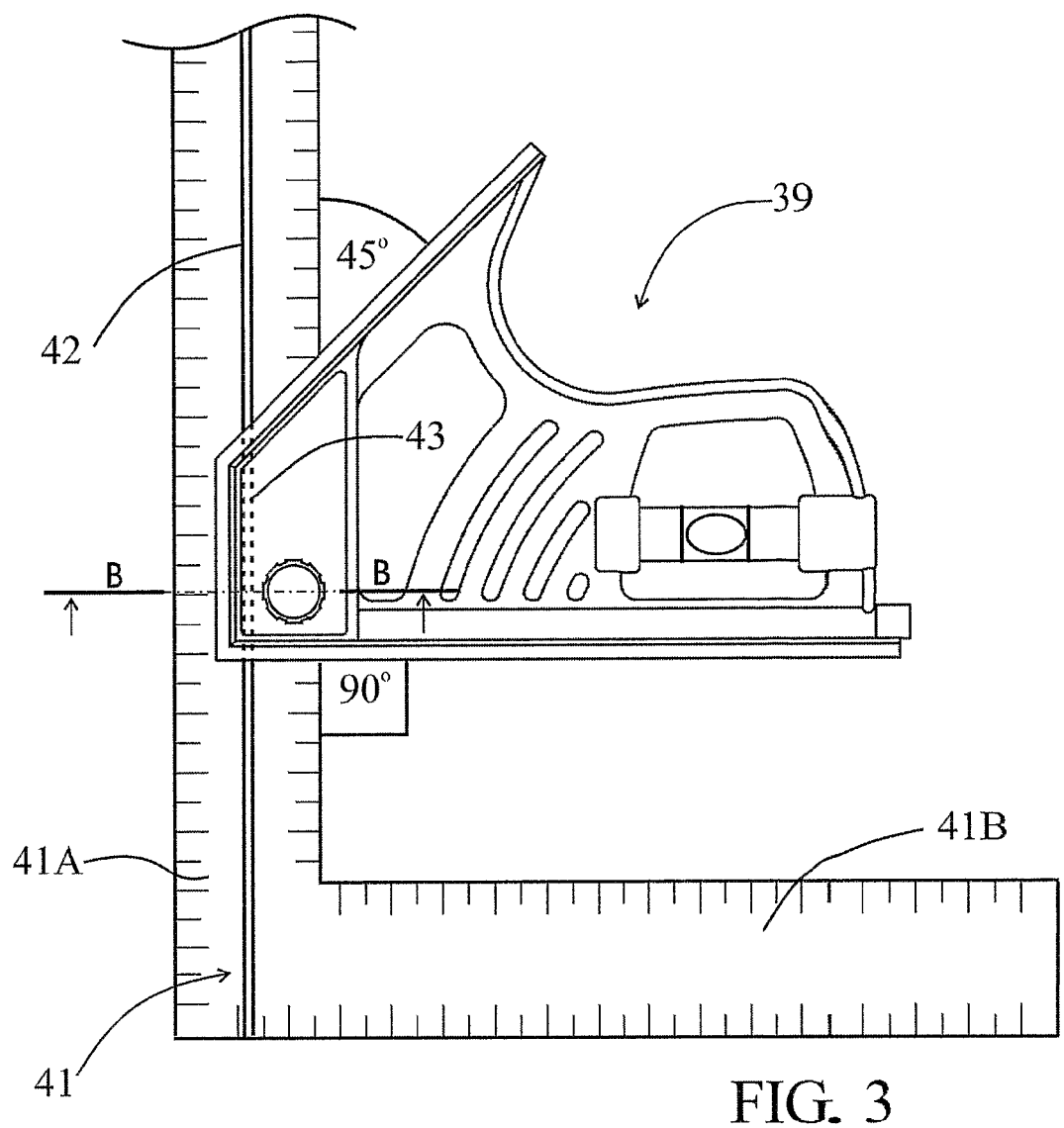
FIG. 3 is a top view of a second embodiment of a combination square in accordance with the present invention laid flat on a planar support surface.
Figure 4:
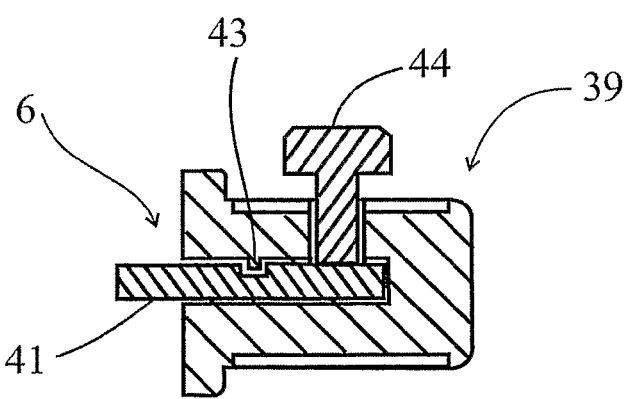
FIG. 4 is a cross section of FIG. 3's combination square along section line B-B.

FIGS. 3 and 4 show a combination square 39 for use with an L-shaped rule-type blade 41 having a grooved long leg 41A with a longitudinal groove 42, and a non-grooved short leg 41B. The combination square 39 has a similar construction to the combination square 1 but it additionally includes a runner 43 for constraining the blade 41 to sliding lengthwise movement in its blade retaining slot 6. The combination square 39 also includes a manually operated screw based securing member 44 for selectively bearing against the blade 41 for frictionally securing same in the blade retaining slot 6.

While the invention has been described with respect to a limited number of embodiments, it will be appreciated that many variations, modifications, and other applications of the invention can be made within the scope of the appended claims.

The invention claimed is:

1. A combination square for use with a magnetic rule-type blade having top and bottom surfaces and at least one pair of opposite long edges, the combination square comprising a magnetic housing having a leading portion with a front surface and opposite side surfaces subtending internal 90° and 135° angles with said front surface, and a blade retaining slot for releasably magnetically retaining the blade for correspondingly subtending a 90° shoulder and a 45° shoulder with said opposite side surfaces of said magnetic housing in said top view of the combination square laid flat on a planar support surface.

2. The square according to claim 1 for use with a grooved magnetic rule-type blade wherein said magnetic housing includes a runner for constraining the blade to sliding lengthwise movement within said blade retaining slot.

3. The square according to claim 1 wherein said magnetic housing includes a manually operated securing member for selectively bearing against the blade for frictionally securing the blade therein.

4. The square according to claim 1 wherein said magnetic housing includes at least one magnet with a major surface parallel to the blade's top and bottom surfaces in a cross section of the combination square passing through a pair of the blade's at least one pair of opposite long edges.

5. The square according to claim 4 wherein said magnetic housing includes at least one L-shaped cross section magnet with a major surface parallel to the blade's top and bottom surfaces in a cross section of the combination square passing through a pair of the blade's at least one pair of opposite long edges.

6. The square according to claim 1 wherein said magnetic housing includes at least one magnet with a major surface perpendicular to the blade's top and bottom surfaces in a cross section of the combination square passing through a pair of the blade's at least one pair of opposite long edges.

7. The square according to claim 1 wherein the blade has an L-shape with two pairs of opposite long edges in a top view of the combination square.

* * * * *